United States Patent
Sakagami et al.

(10) Patent No.: US 12,330,985 B2
(45) Date of Patent: Jun. 17, 2025

(54) NEAR-INFRARED CUT FILTER GLASS AND OPTICAL FILTER

(71) Applicant: AGC INC., Tokyo (JP)

(72) Inventors: Takahiro Sakagami, Shizuoka (JP); Kazuhiko Shiono, Fukushima (JP)

(73) Assignee: AGC INC., Tokyo (JP)

( * ) Notice: Subject to any disclaimer, the term of this patent is extended or adjusted under 35 U.S.C. 154(b) by 847 days.

(21) Appl. No.: 17/645,553

(22) Filed: Dec. 22, 2021

(65) Prior Publication Data

US 2022/0112121 A1    Apr. 14, 2022

Related U.S. Application Data

(63) Continuation of application No. PCT/JP2020/024387, filed on Jun. 22, 2020.

(30) Foreign Application Priority Data

Jun. 27, 2019   (JP) .................................. 2019-120235
Feb. 4, 2020    (JP) .................................. 2020-017204

(51) Int. Cl.
| | | |
|---|---|---|
| *C03C 4/08* | (2006.01) | |
| *C03C 3/17* | (2006.01) | |
| *C03C 17/42* | (2006.01) | |
| *C09D 5/32* | (2006.01) | |
| *C09D 7/41* | (2018.01) | |

(Continued)

(52) U.S. Cl.
CPC ................ *C03C 4/082* (2013.01); *C03C 3/17* (2013.01); *C03C 17/42* (2013.01); *C09D 5/32* (2013.01);

(Continued)

(58) Field of Classification Search
CPC ........ G02B 5/208; C09D 179/08; C09D 5/32; C09D 7/41; C03C 17/42; C03C 2217/212;

(Continued)

(56) References Cited

U.S. PATENT DOCUMENTS

| | | |
|---|---|---|
| 2006/0217257 A1 | 9/2006 | Nagashima et al. |
| 2014/0162863 A1 | 6/2014 | Costin et al. |

(Continued)

FOREIGN PATENT DOCUMENTS

| | | |
|---|---|---|
| CN | 109476531 A | 3/2019 |
| CN | 109562981 A | 4/2019 |

(Continued)

OTHER PUBLICATIONS

Tomozawa, M. et al., Translator: Jin, G. et al. "Interaction between glass and electromagnetic radiation", China Architecture & Building Press, Dec. 1981, pp. 48-49, (with partial English translation).

(Continued)

*Primary Examiner* — Shuangyi Abu Ali
(74) *Attorney, Agent, or Firm* — Oblon, McClelland, Maier & Neustadt, L.L.P.

(57) ABSTRACT

A near-infrared cut filter glass has: an average transmittance in a wavelength range of 400-550 nm of 50-92%; a transmittance at a wavelength of 700 nm of 40-92%; an average transmittance in a wavelength range of 850-950 nm of 0.0001-70%; and an average transmittance in a wavelength range of 1200-2500 nm of 0.0001-60%.

20 Claims, 2 Drawing Sheets

(51) Int. Cl.
*C09D 179/08* (2006.01)
*G02B 5/20* (2006.01)

(52) U.S. Cl.
CPC .............. *C09D 7/41* (2018.01); *C09D 179/08* (2013.01); *G02B 5/208* (2013.01); *C03C 2217/212* (2013.01); *C03C 2217/213* (2013.01); *C03C 2218/15* (2013.01)

(58) Field of Classification Search
CPC ........ C03C 2217/213; C03C 2217/734; C03C 2218/15; C03C 3/17; C03C 4/082
See application file for complete search history.

(56) References Cited

U.S. PATENT DOCUMENTS

| | | |
|---|---|---|
| 2015/0307389 A1 | 10/2015 | He et al. |
| 2018/0364095 A1 | 12/2018 | Nagaya et al. |
| 2020/0278243 A1 | 9/2020 | Nagaya et al. |

FOREIGN PATENT DOCUMENTS

| | | | | |
|---|---|---|---|---|
| DE | 25 31 709 A1 | | 1/1977 | |
| JP | 39-25563 B1 | | 11/1964 | |
| JP | 44-4201 B1 | | 2/1969 | |
| JP | 3-109234 A | | 5/1991 | |
| JP | 2006-264994 A | | 10/2006 | |
| JP | 2010-8908 A | | 1/2010 | |
| JP | 2017222568 A | * | 12/2017 | ............ C03C 3/064 |
| TW | 201518238 A | | 5/2015 | |
| WO | WO 2017/094672 A1 | | 6/2017 | |

OTHER PUBLICATIONS

Maltsev et al., Translator: Zhang, Z. et al., "Calculation of tolerance of optical parts", National Defense Industry Press, May 1980, pp. 192-194, (with partial English translation).

International Search Report issued Sep. 8, 2020 in PCT/JP2020/024387, filed on Jun. 22, 2020, 3 pages.

* cited by examiner

NEAR-INFRARED CUT FILTER GLASS AND OPTICAL FILTER

TECHNICAL FIELD

The present invention relates to a near-infrared cut filter glass which is for use in, for example, color correction filters in digital still cameras, color video cameras, etc. and is excellent especially in terms of transparency to visible-region light and absorption of near-infrared-region light. The present invention further relates to an optical filter.

BACKGROUND ART

With the recent progress of the technology of autonomous driving of motor vehicles, investigations are being made on a technique for detecting objects with pulsed infrared laser light, which is called LiDAR (light detection and ranging). Although there is infrared laser light having a wavelength of 1000 nm or shorter, this laser light is likely to affect the retinae of the human eyes and is hence used with reduced outputs.

Because of this, use of infrared laser light having a wavelength of 1550 nm is being investigated. Laser light having a wavelength of 1550 nm, after having struck on a human eye, is obstructed by the liquid within the eyeball and does not reach the retina. This laser light can hence be used with higher outputs.

Meanwhile, solid imaging elements, such as CCDs and CMOSs, for use in digital still cameras, etc. have spectral sensitivity over a range of from the visible region to a near-infrared region around a wavelength of 1200 nm. Consequently, the solid imaging elements as such are unable to attain satisfactory color reproducibility and, hence, the luminosity is corrected using a near-infrared cut filter glass to which a specific substance absorbing infrared light has been added. The compositions of such glass are disclosed in Patent Literatures 1 to 3.

CITATION LIST

Patent Literature

Patent Literature 1: JP-A-2010-8908
Patent Literature 2: JP-A-2017-222568
Patent Literature 3: JP-A-H3-109234

SUMMARY OF INVENTION

Technical Problems

The glass described in Patent Literature 1 to which Cu (copper) has been added is a filter which blocks infrared light by absorption by copper ions. However, copper ions show such light absorption properties that the absorption is maximum at around a wavelength of 900 nm, and the transmittance tends to gradually increase from a wavelength of 900 nm toward the longer-wavelength side. Although not mentioned in Patent Literature 1, the transmittance at wavelengths exceeding 1200 nm is assumed to be high. In conventional color correction filters, the transmittance for light having wavelengths exceeding 1200 nm is not considered at all because it exerts little influence on captured images.

The laser light having a wavelength of 1550 nm emitted from a LiDAR is pulsed high-power light. Because of this, in cases when a LiDAR includes a camera mounted near the laser light emission part or when a photograph is taken in the vicinity of a vehicle in which a LiDAR is operating, there is a possibility that laser light having a wavelength of 1550 nm which has accidentally entered the camera as a stray light might not be sufficiently blocked, resulting in damage to the solid imaging element of the camera or in an operation error.

Meanwhile, filter glass containing iron ions, which show light absorption on the longer-wavelength side than copper ions, are described in Patent Literatures 2 and 3. However, these kinds of glass have low iron contents, which are insufficient for blocking laser light having a wavelength of 1550 nm.

In filter glass containing iron ions, increasing the iron content in the glass may result in a considerable decrease in the transmittance for visible-region light. Iron ions in a glass can be present in the $Fe^{2+}$ (divalent) and $Fe^{3+}$ (trivalent) states; $Fe^{2+}$ absorbs near-infrared light, while $Fe^{3+}$ absorbs visible-region light. It is hence possible to enhance the near-infrared light absorption properties by merely increasing the iron content in the glass, but the increased iron content results also in a decrease in visible-region light transmission property. This glass therefore is unsuitable for use as a color correction filter for solid imaging elements.

An object of the present invention, which has been achieved under such circumstances, is to provide a near-infrared cut filter glass which can reduce the transmission of near-infrared-region light having wavelengths exceeding 1200 nm, while retaining a high transmittance for visible-region light, and to further provide an optical filter.

Solution to the Problems

The present inventors diligently made investigations and, as a result, have discovered that a near-infrared cut filter glass capable of blocking near-infrared-region light having longer wavelengths as compared with conventional near-infrared cut filter glass is obtained by imparting specific optical properties to a glass. Furthermore, the inventors have discovered that an optical filter in which the property of blocking specific near-infrared-region light can be regulated at will is obtained by providing at least one principal surface of the near-infrared cut filter glass with an absorption layer containing a near-infrared light absorber.

A near-infrared cut filter glass according to an embodiment of the present invention has an average transmittance in a wavelength range of 400-550 nm of 50-92%, a transmittance at a wavelength of 700 nm of 40-92%, an average transmittance in a wavelength range of 850-950 nm of 0.0001-70%, and an average transmittance in a wavelength range of 1200-2500 nm of 0.0001-60%.

The near-infrared cut filter glass according to an embodiment of the present invention preferably includes, $P_2O_5$, $Al_2O_3$, R'O and $Fe_2O_3$ as essential components, in which R'O represents one or more oxides selected from the group consisting of MgO, CaO, SrO, BaO, and ZnO, in which the near-infrared cut filter glass contains substantially no F (fluorine), and contains 0.1-35% of $Fe_2O_3$ as represented by mol % based on oxides.

The near-infrared cut filter glass according to an embodiment of the present invention preferably includes, as represented by mol % based on oxides: 40-75% of $P_2O_5$; 5-22% of $Al_2O_3$; 0-20% of $R_2O$, in which $R_2O$ represents the sum of $Li_2O$, $Na_2O$, and $K_2O$; 0.1-35% of R"O, in which R"O represents the sum of MgO, CaO, SrO, BaO, and ZnO; and 5-35% of $Fe_2O_3$.

The near-infrared cut filter glass according to an embodiment of the present invention preferably includes, as represented by mol % based on oxides: 25-75% of $P_2O_5$; 2.5-22% of $Al_2O_3$; 0-35% of $R_2O$, in which $R_2O$ represents the sum of $Li_2O$, $Na_2O$, and $K_2O$; 0.1-35% of R"O, in which R"O represents the sum of MgO, CaO, SrO, BaO, and ZnO; and 0.1-5% (excluding 5%) of $Fe_2O_3$.

The near-infrared cut filter glass according to an embodiment of the present invention preferably includes, as represented by mol % based on oxides: 40-75% of $P_2O_5$; 5-22% of $Al_2O_3$; 0.1-20% of $R_2O$, in which $R_2O$ represents the sum of $Li_2O$, $Na_2O$, and $K_2O$; 0.1-25% of R"O, in which R"O represents the sum of MgO, CaO, SrO, BaO, and ZnO; and 0.1-5% (excluding 5%) of $Fe_2O_3$.

The near-infrared cut filter glass according to an embodiment of the present invention preferably contains 0.1-20% of ZnO as represented by mol % based on oxides.

The near-infrared cut filter glass according to an embodiment of the present invention preferably has a proportion by mass of divalent iron ($Fe^{2+}$) to a total iron content in terms of $Fe_2O_3$, $Fe^{2+}$/(total Fe content)$\times$100[%], of 25-99%.

An optical filter according to an embodiment of the present invention includes: any of the near-infrared cut filter glass described above; and an absorption layer provided on at least one principal surface of the near-infrared cut filter glass, the absorption layer containing a near-infrared light absorber having a maximum-absorption wavelength in a wavelength range of 600-1200 nm.

The optical filter according to an embodiment of the present invention preferably has an average transmittance in a wavelength range of 400-550 nm of 50% or higher, a transmittance at a wavelength of 700 nm of 92% or less, an average transmittance in a wavelength range of 850-950 nm of 70% or less, and an average transmittance in a wavelength range of 1200-2500 nm of 60% or less, in which the transmittances are measured when causing light to enter the principal surface of the optical filter from a normal direction.

The optical filter according to an embodiment of the present invention preferably is one which, in a wavelength range of 550-1200 nm, has a difference of absolute values $|\lambda_{LO50(0\ deg)}-\lambda_{LO50(30\ deg)}|$ between $\lambda_{LO50(0\ deg)}$ and $\lambda_{LO50(30\ deg)}$ of 18 nm or less, the $\lambda_{LO50(0\ deg)}$ being a wavelength at which a transmittance of light caused to enter the principal surface from a normal direction is 50%, the $\lambda_{LO50(30\ deg)}$ being a wavelength at which a transmittance of light caused to enter the principal surface at an angle of 30° with respect to the normal direction is 50%.

In the optical filter according to an embodiment of the present invention, the absorption layer preferably includes a transparent resin which is constituted of a single resin or a mixture of two or more resins, the single resin and the two or more resins being selected from the group consisting of acrylic resins, epoxy resins, ene-thiol resins, polycarbonate resins, polyether resins, polyarylate resins, polysulfone resins, polyethersulfone resins, poly(p-phenylene) resins, poly (arylene ether phosphine oxide) resins, polyimide resins, polyamideimide resins, polyolefin resins, cycloolefin resins, and polyester resins.

In the optical filter according to an embodiment of the present invention, the near-infrared light absorber preferably includes at least one dye selected from the group consisting of squarylium dyes, phthalocyanine dyes, cyanine dyes, and diimonium dyes.

Advantageous Effects of Invention

The present invention makes it possible to obtain a near-infrared cut filter glass capable of blocking near-infrared-region light having longer wavelengths as compared with conventional near-infrared cut filter glass. Thus, even if light having a wavelength exceeding 1200 nm enters an imaging device or a sensing device, the solid imaging element can be inhibited from being damaged or operating erroneously. Furthermore, it is possible to obtain an optical filter which not only blocks near-infrared-region light having longer wavelengths but also highly blocks near-infrared-region light.

DESCRIPTION OF EMBODIMENTS

Figure 1:
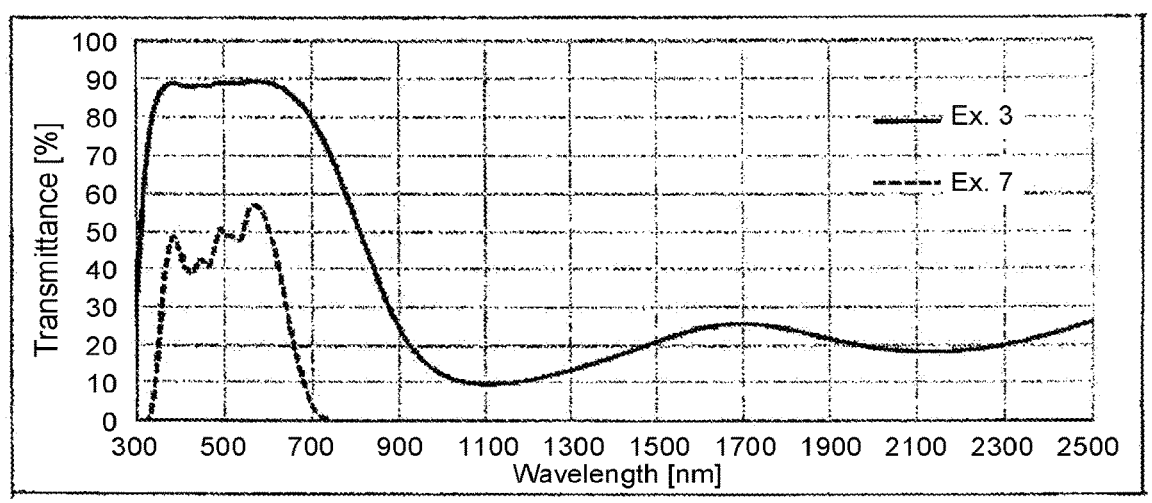
FIG. 1 is a diagram schematically showing examples of the transmittance characteristics of near-infrared cut filter glass according to an embodiment (Example 3) of the present invention and a comparative configuration (Example 7).

The near-infrared cut filter glass (hereinafter often referred to simply as "glass") according to an embodiment of the present invention has an average transmittance in a wavelength range of 400-550 nm of 50-92%, a transmittance at a wavelength of 700 nm of 40-92%, an average transmittance in a wavelength range of 850-950 nm of 0.0001-70%, and an average transmittance in a wavelength range of 1200-2500 nm of 0.0001-60%. In this description, each numerical range indicated with "-" includes the upper and lower limits. The glass having such optical properties makes it possible to obtain a solid imaging element which is inhibited from being damaged or operating erroneously even if light having a wavelength exceeding 1200 nm enters the imaging device or sensing device. This glass can have a high transmittance for visible-region light and be suitable for use as the color correction filter of a solid imaging element.

The glass according to this embodiment has an average transmittance in a wavelength range of 400-550 nm of 50-92%. This makes it possible to attain a high transmittance for visible-region light and to obtain clear captured images.

In the case where the average transmittance of the glass in the wavelength range of 400-550 nm is less than 50%, there is a possibility that color reproducibility regarding blue and green might be poor, resulting in unclear captured images. In the case where the average transmittance of the glass in the wavelength range of 400-550 nm exceeds 92%, it is necessary to reduce, as much as possible, the content in the glass of components which absorb visible-region light and this may result in an increase in production cost.

The average transmittance of the glass in a wavelength range of 400-550 nm is preferably 55-92%, more preferably 60-92%.

The glass according to this embodiment has a transmittance at a wavelength of 700 nm of 40-92%. This brings about a high transmittance for red light, rendering the glass suitable for use in sensing the state of the surrounding environment using captured images. For example, red lights from signals and red lights from illuminators other than signals can be more reliably distinguished from each other using captured images.

In the case where the transmittance of the glass at a wavelength of 700 nm is less than 40%, there is a possibility that color reproduction regarding red might be poor, resulting in unclear captured images. In the case where the transmittance of the glass at a wavelength of 700 nm exceeds 92%, it is necessary to reduce, as much as possible, the content in the glass of components which absorb red light and this may result in an increase in production cost.

The transmittance of the glass at a wavelength of 700 nm is preferably 45-92%, more preferably 50-92%.

The glass according to this embodiment has an average transmittance in a wavelength range of 850-950 nm of 0.0001-70%. This makes it possible to appropriately reduce the transmittance for near-infrared light, rendering the glass suitable for use in sensing the state of the surrounding environment using captured images.

In the case where the average transmittance of the glass in the wavelength range of 850-950 nm is less than 0.0001%, it is difficult to also attain the transmittance for light having a wavelength of 700 nm. Meanwhile, in the case where the average transmittance of the glass in the wavelength range of 850-950 nm exceeds 70%, there is a possibility that color reproducibility regarding red might be poor, resulting in unclear captured images.

The average transmittance of the glass in a wavelength range of 850-950 nm is preferably 0.0001-50%, more preferably 0.0001-40%, still more preferably 0.0001-35%.

The glass according to this embodiment has an average transmittance in a wavelength range of 1200-2500 nm of 0.0001-60%. This brings about a high transmittance for red light, rendering the glass suitable for use in sensing the state of the surrounding environment using captured images.

In the case where the average transmittance of the glass in the wavelength range of 1200-2500 nm is less than 0.0001%, it is difficult to also attain the transmittance for visible-region light. Meanwhile, in the case where the average transmittance of the glass in the wavelength range of 1200-2500 nm exceeds 60%, there is a possibility that if light having a wavelength within that range enters a solid imaging element, the light might be insufficiently blocked and the solid imaging element might be damaged or operate erroneously.

The average transmittance of the glass in a wavelength range of 1200-2500 nm is preferably 0.0001-50%, more preferably 0.0001-40%.

The term "transmittance" used for the glass according to this embodiment means optical properties determined by examining the glass in the state of having no functional film, e.g., an antireflection film, on either of the principal surfaces thereof.

The transmittance of the glass according to this embodiment is not a value in terms of a specific plate thickness. This is because a near-infrared cut filter glass is to be used in applications such as the color correction filter of a solid imaging element, the light-receiving part of an infrared sensor, and the like, in which transmittances for light ranging from the visible region to the infrared region are important, and because the near-infrared cut filter glass is not used in a specific plate thickness. Consequently, among glass having the same composition, some satisfy the transmittances and others do not, depending on the plate thicknesses.

The near-infrared cut filter glass, in cases when it is used, for example, as the color correction filter of a solid imaging element, is frequently used in a thickness of usually 2 mm or less. From the standpoint of weight reduction in components, the glass is used in a thickness of preferably 1 mm or less, more preferably 0.5 mm or less. Meanwhile, from the standpoint of ensuring the strength of the glass, the thickness of the glass is preferably 0.05 mm or larger.

The near-infrared cut filter glass, in cases when it is used, for example, in the light-receiving part of an infrared sensor, is frequently used in a thickness of usually 3 mm or less. From the standpoint of weight reduction in components, the glass is used in a thickness of preferably 2 mm or less, more preferably 1 mm or less. Meanwhile, from the standpoint of ensuring the strength of the glass, the thickness of the glass is preferably 0.05 mm or larger.

It is preferable that the glass according to this embodiment includes, as represented by mol % based on oxides, $P_2O_5$, $Al_2O_3$, R'O (R'O represents one or more oxides selected from the group consisting of MgO, CaO, SrO, BaO, and ZnO), and $Fe_2O_3$ as essential components, contains substantially no F, and contains 0.1-35% of $Fe_2O_3$.

$P_2O_5$ is a main component (glass-forming oxide) which forms the glass, and is an essential component for enhancing the near-infrared-region blocking properties.

$Al_2O_3$ is a main component (glass-forming oxide) which forms the glass, and is an essential component for heightening the weather resistance, etc.

R'O (R'O represents one or more oxides selected from the group consisting of MgO, CaO, SrO, BaO, and ZnO) is an essential component for lowering the melting temperature of the glass, lowering the liquidus temperature of the glass, stabilizing the glass, enhancing the strength of the glass, etc.

$Fe_2O_3$ is an essential component for blocking near-infrared light. The content thereof is preferably 0.1-35%. In the case where the content thereof is less than 0.1%, the effect of $Fe_2O_3$ is not sufficiently obtained in cases when the glass has a reduced thickness. Meanwhile, contents thereof exceeding 35% result in a decrease in transmittance for visible-region light. Such too low or too high contents of $Fe_2O_3$ are hence undesirable. The content of $Fe_2O_3$ is preferably 0.5-35%, more preferably 1.0-35%, still more preferably 2.0-35%.

The content of $Fe_2O_3$ in this embodiment is the total content of the all Fe (iron) components in terms of $Fe_2O_3$.

The glass according to this embodiment preferably contains substantially no F (fluorine). Although effective in heightening the weather resistance of the glass, F is an environmentally harmful substance. It is hence preferable that the glass does not contain fluorine. In this description, the expression "containing substantially no X" means that X has not been used as a raw material on purpose, and X which has been mixed as an unavoidable impurity from a component of a raw material or in a production step is regarded as being not contained.

The glass according to this embodiment includes two preferred embodiments. A glass according to the first embodiment (hereinafter referred to as glass A) will be explained first.

Glass A for use as the near-infrared cut filter glass according to this embodiment preferably includes, as represented by mol % based on oxides, 40-75% of $P_2O_5$, 5-22% of $Al_2O_3$, 0-20% of $R_2O$ ($R_2O$ represents the sum of $Li_2O$, $Na_2O$, and $K_2O$), 0.1-35% of R"O (R"O represents the sum of MgO, CaO, SrO, BaO, and ZnO), and 5-35% of $Fe_2O_3$. The reasons for limiting the contents of those components to those ranges are explained below.

$P_2O_5$ is a main component for forming the glass and is an essential component for enhancing the near-infrared-region blocking properties. However, the content of $P_2O_5$ less than 40% are undesirable because the effect of blocking near-infrared-region light is not sufficiently obtained and the proportion of $Fe^{3+}$ in the iron components in the glass increases to reduce the transmittance for visible-region light. The content of $P_2O_5$ exceeding 75% are undesirable because such too high $P_2O_5$ content arouses problems such as impaired stability of the glass and reduced weather resistance. The content of $P_2O_5$ is more preferably 42-73%, still more preferably 44-70%, yet still more preferably 45-65%.

$Al_2O_3$ is a main component for forming the glass and is an essential component for heightening the weather resistance of the glass, enhancing the strength of the glass, etc. However, the content of $Al_2O_3$ less than 5% are undesirable because the effects thereof are not sufficiently obtained, while the content thereof exceeding 22% are undesirable because such too high $Al_2O_3$ content arouse problems such as impaired stability of the glass and a decrease in infrared-light blocking property. The content of $Al_2O_3$ is more preferably 6-20%, still more preferably 8-18%.

R'O (R'O represents one or more oxides selected from the group consisting of MgO, CaO, SrO, BaO, and ZnO) is an essential component for lowering the melting temperature of the glass, lowering the liquidus temperature of the glass, stabilizing the glass, enhancing the strength of the glass, etc. However, in the case where the total content of R'O (the total content being expressed by R"O) is less than 0.1%, the effects thereof are not sufficiently obtained. In the case where the total content thereof exceeds 35%, this arouses problems such as impaired stability of the glass, a decrease in infrared-light blocking property, and a decrease in the strength of the glass. Such too low or too high contents thereof are hence undesirable. The total content (R"O) of R'O is more preferably 1-33%, still more preferably 1.5-32%, yet still more preferably 2-30%, most preferably 2.5-29%.

MgO, although not essential, is a component for lowering the melting temperature of the glass, lowering the liquidus temperature of the glass, stabilizing the glass, enhancing the strength of the glass, etc. The content of MgO, when it is contained, is preferably 0.5-15%. The content of MgO less than 0.5% are undesirable because the effects thereof are not sufficiently obtained, while the content thereof exceeding 15% are undesirable because the glass is unstable. The content of MgO is more preferably 1.0-13%, still more preferably 1.5-10%.

CaO, although not essential, is a component for lowering the melting temperature of the glass, lowering the liquidus temperature of the glass, stabilizing the glass, enhancing the strength of the glass, etc. The content of CaO, when it is contained, is preferably 0.1-10%. The content of CaO less than 0.1% are undesirable because the effects thereof are not sufficiently obtained, while the content thereof exceeding 10% are undesirable because the glass is unstable. The content of CaO is more preferably 0.3-8%, still more preferably 0.5-6%.

SrO, although not essential, is a component for lowering the melting temperature of the glass, lowering the liquidus temperature of the glass, stabilizing the glass, etc. The content of SrO, when it is contained, is preferably 0.1-10%. The content of SrO less than 0.1% are undesirable because the effects thereof are not sufficiently obtained, while the content thereof exceeding 10% are undesirable because the glass is unstable. The content of SrO is more preferably 0.3-8%, still more preferably 0.5-8%.

BaO, although not essential, is a component for lowering the melting temperature of the glass, lowering the liquidus temperature of the glass, stabilizing the glass, etc. The content of BaO, when it is contained, is preferably 0.1-10%. The content thereof less than 0.1% are undesirable because the effects thereof are not sufficiently obtained, while the content of BaO exceeding 10% are undesirable because the glass is unstable. The content of BaO is more preferably 0.5-8%, still more preferably 1-6%.

ZnO, although not essential, has the effects of lowering the melting temperature of the glass, lowering the liquidus temperature of the glass, etc. The content of ZnO, when it is contained, is preferably 0.5-20%. The content of ZnO less than 0.5% are undesirable because the effects thereof are not sufficiently obtained, while the content thereof exceeding 20% are undesirable because the glass has impaired meltability. The content of ZnO is more preferably 1-18%, still more preferably 1.5-17%.

$Fe_2O_3$ is an essential component for blocking near-infrared light. The content of $Fe_2O_3$ is preferably 5-35%. The content of $Fe_2O_3$ less than 5% are undesirable because the effect thereof is not sufficiently obtained when the glass has a reduced thickness, while the content thereof exceeding 35% are undesirable because the glass has a reduced transmittance for visible-region light. The content of $Fe_2O_3$ is preferably 6-35%, more preferably 7-35%, still more preferably 8-35%.

Alkali metal oxides (representing one or more oxides selected from the group consisting of $Li_2O$, $Na_2O$, and $K_2O$), although not essential, are components for heightening the coefficient of thermal expansion of the glass, lowering the melting temperature of the glass, lowering the liquidus temperature of the glass, stabilizing the glass, etc. However, in the case where $R_2O$ ($R_2O$ represents the total content of $Li_2O$, $Na_2O$, and $K_2O$) exceeds 20%, the glass is unstable; such too high contents thereof are hence undesirable. $R_2O$ is more preferably 0.5-18%, still more preferably 1.0-16%, yet still more preferably 1.5-15%.

$Li_2O$, although not essential, is a component for lowering the melting temperature of the glass, lowering the liquidus temperature of the glass, stabilizing the glass, etc. The content of $Li_2O$, when it is contained, is preferably 0-10%. The content of $Li_2O$ exceeding 10% are undesirable because the glass is unstable. The content of $Li_2O$ is more preferably 0.5-8%, still more preferably 1-7%.

$Na_2O$, although not essential, is a component for lowering the melting temperature of the glass, lowering the liquidus temperature of the glass, stabilizing the glass, etc. The content of $Na_2O$, when it is contained, is preferably 0-20%. The content of $Na_2O$ exceeding 20% are undesirable because the glass is unstable. The content of $Na_2O$ is more preferably 0.7-18%, still more preferably 1-16%.

$K_2O$, although not essential, is a component having the effects of lowering the melting temperature of the glass, lowering the liquidus temperature of the glass, etc. The content of $K_2O$ is preferably 0-15%. The content of $K_2O$ exceeding 15% are undesirable because the glass is unstable. The content of $K_2O$ is more preferably 0.5-13%, still more preferably 0.7-10%.

$B_2O_3$, although not an essential component, may be contained in an amount of 10% or lower in order to stabilize the glass. The content of $B_2O_3$ exceeding 10% are undesirable because the glass may have impaired weather resistance or too high a melting temperature. The content of $B_2O_3$ is preferably 0-9%, more preferably 0-8.5%, still more preferably 0-8%, most preferably 0-7.5%.

Next, a glass according to the second embodiment of the present invention (hereinafter referred to as glass B) will be explained.

Glass B for use as the near-infrared cut filter glass according to this embodiment preferably includes, as represented by mol % based on oxides, 25-75% of $P_2O_5$, 2.5-22% of $Al_2O_3$, 0-35% of $R_2O$ ($R_2O$ represents the sum of $Li_2O$, $Na_2O$, and $K_2O$), 0.1-35% of R"O (R"O represents the sum of MgO, CaO, SrO, BaO, and ZnO), and 0.1-5% (excluding 5%) of $Fe_2O_3$. The reasons for limiting the contents of those components to those ranges are explained below.

$P_2O_5$ is a main component for forming the glass and is an essential component for enhancing the near-infrared-region blocking properties. However, the content thereof less than 25% are undesirable because the effect of blocking near-infrared-region light is not sufficiently obtained and the proportion of $Fe^{3+}$ in the iron components in the glass increases to reduce the transmittance for visible-region light. The content of $P_2O_5$ exceeding 75% are undesirable because such too high $P_2O_5$ content arouse problems such as impaired stability of the glass and reduced weather resistance. The content of $P_2O_5$ is more preferably 30-73%, still more preferably 32-70%, yet still more preferably 33-65%.

$Al_2O_3$ is a main component for forming the glass and is an essential component for heightening the weather resistance of the glass, enhancing the strength of the glass, etc. However, the content of $Al_2O_3$ less than 2.5% are undesirable because the effects thereof are not sufficiently obtained, while the content thereof exceeding 22% are undesirable because such too high $Al_2O_3$ content arouse problems such as impaired stability of the glass and a decrease in infrared-light blocking property. The content of $Al_2O_3$ is more preferably 3-20%, still more preferably 3.5-18%.

R'O (R'O represents one or more oxides selected from the group consisting of MgO, CaO, SrO, BaO, and ZnO) is an essential component for lowering the melting temperature of the glass, lowering the liquidus temperature of the glass, stabilizing the glass, enhancing the strength of the glass, etc. However, in the case where the total content of R'O (the total content being expressed by R"O) is less than 0.1%, the effects thereof are not sufficiently obtained. In the case where the total content thereof exceeds 35%, this arouses problems such as impaired stability of the glass, a decrease in infrared-light blocking property, and a decrease in the strength of the glass. Such too low or too high contents thereof are hence undesirable. The total content (R"O) of R'O is more preferably 1-33%, still more preferably 1.5-32%, yet still more preferably 2-30%, most preferably 2.5-29%.

MgO, although not essential, is a component for lowering the melting temperature of the glass, lowering the liquidus temperature of the glass, stabilizing the glass, enhancing the strength of the glass, etc. The content of MgO, when it is contained, is preferably 0.5-15%. The content of MgO less than 0.5% are undesirable because the effects thereof are not sufficiently obtained, while the content thereof exceeding 15% are undesirable because the glass is unstable. The content of MgO is more preferably 1-13%, still more preferably 1.5-10%.

CaO, although not essential, is a component for lowering the melting temperature of the glass, lowering the liquidus temperature of the glass, stabilizing the glass, enhancing the strength of the glass, etc. The content of CaO, when it is contained, is preferably 0.1-10%. The content of CaO less than 0.1% are undesirable because the effects thereof are not sufficiently obtained, while the content thereof exceeding 10% are undesirable because the glass is unstable. The content of CaO is more preferably 0.3-8%, still more preferably 0.5-6%.

SrO, although not essential, is a component for lowering the melting temperature of the glass, lowering the liquidus temperature of the glass, stabilizing the glass, etc. The content of SrO, when it is contained, is preferably 0.1-10%. The content of SrO less than 0.1% are undesirable because the effects thereof are not sufficiently obtained, while the content thereof exceeding 10% are undesirable because the glass is unstable. The content of SrO is more preferably 0.3-8%, still more preferably 0.5-8%.

BaO, although not essential, is a component for lowering the melting temperature of the glass, lowering the liquidus temperature of the glass, stabilizing the glass, etc. The content of BaO, when it is contained, is preferably 0.1-10%. The content of BaO less than 0.1% are undesirable because the effects thereof are not sufficiently obtained, while the content thereof exceeding 10% are undesirable because the glass is unstable. The content of BaO is more preferably 0.5-8%, still more preferably 1-6%.

ZnO, although not essential, has the effects of lowering the melting temperature of the glass, lowering the liquidus temperature of the glass, etc., and is preferably contained in an amount of 0.1% or larger. The content of ZnO, when it is contained, is preferably 0.1-20%. The content of ZnO less than 0.1% are undesirable because the effects thereof are not sufficiently obtained, while the content thereof exceeding 20% are undesirable because the glass has impaired meltability. The content of ZnO is more preferably 0.5-19%, still more preferably 1.0-18%.

$Fe_2O_3$ is an essential component for blocking near-infrared light. The content of $Fe_2O_3$ is preferably 0.1% or higher and less than 5%. In the case where the content of $Fe_2O_3$ is less than 0.1%, the effect thereof is not sufficiently obtained even when the glass has an increased thickness. In the case where the content thereof is 5% or higher, although high near-infrared-region blocking properties are obtained, strict valence control of the iron components is necessary for preventing the transmittance for visible-region light from decreasing, and this may result in an increase in production cost. The content of $Fe_2O_3$ is preferably 0.5-5% (excluding 5%), more preferably 0.7-5% (excluding 5%), still more preferably 0.8-5% (excluding 5%).

Alkali metal oxides (representing one or more oxides selected from the group consisting of $Li_2O$, $Na_2O$, and $K_2O$), although not essential, are components for heightening the coefficient of thermal expansion of the glass, lowering the melting temperature of the glass, lowering the liquidus temperature of the glass, stabilizing the glass, etc. $R_2O$ ($R_2O$ represents the total content of $Li_2O$, $Na_2O$, and $K_2O$) is preferably 0.1% or higher. However, in the case where $R_2O$ exceeds 35%, the glass is unstable; such too high contents thereof are hence undesirable. $R_2O$ is more preferably 0.1-33%, still more preferably 0.5-30%, yet still more preferably 0.9-28%.

$Li_2O$, although not essential, is a component for lowering the melting temperature of the glass, lowering the liquidus temperature of the glass, stabilizing the glass, etc. The content of $Li_2O$, when it is contained, is preferably 0-10%. The content of $Li_2O$ exceeding 10% are undesirable because the glass is unstable. The content of $Li_2O$ is more preferably 0.5-8%, still more preferably 1-7%.

$Na_2O$, although not essential, is a component for lowering the melting temperature of the glass, lowering the liquidus temperature of the glass, stabilizing the glass, etc. The content of $Na_2O$, when it is contained, is preferably 0-20%. The content of $Na_2O$ exceeding 20% are undesirable because the glass is unstable. The content of $Na_2O$ is more preferably 0.7-18%, still more preferably 1-16%.

$K_2O$, although not essential, is a component having the effects of lowering the melting temperature of the glass, lowering the liquidus temperature of the glass, etc. The content of $K_2O$ is preferably 0-15%. The content of $K_2O$ exceeding 15% are undesirable because the glass is unstable. The content of $K_2O$ is more preferably 0.5-13%, still more preferably 0.7-10%.

$B_2O_3$, although not an essential component, may be incorporated in an amount of 10% or lower in order to stabilize the glass. The content of $B_2O_3$ exceeding 10% are undesirable because the glass may have impaired weather resistance or too high a melting temperature. The content of $B_2O_3$ is preferably 0-9%, more preferably 0-8.5%, still more preferably 0-8%, most preferably 0-7.5%.

From the standpoint of heightening the proportion of $Fe^{3+}$ to the total content of all the Fe components in terms of $Fe_2O_3$, which will be described later, it is more preferable that glass B for use as the near-infrared cut filter glass according to this embodiment includes, as represented by mol % based on oxides, 40-75% of $P_2O_5$, 5-22% of $Al_2O_3$, 0.1-20% of $R_2O$ ($R_2O$ represents the sum of $Li_2O$, $Na_2O$, and $K_2O$), 0.1-25% of R"O (R"O represents the sum of MgO, CaO, SrO, BaO, and ZnO), and 0.1-5% (excluding 5%) of $Fe_2O_3$. This glass composition enables the glass to absorb light having wavelengths of 1000 nm or longer, while being inhibited from decreasing in transmittance at wavelengths around 400 nm.

Next, matters common between glass A and glass B according to this embodiment will be explained.

The glass according to this embodiment preferably contains substantially no PbO or $As_2O_3$. PbO is a component which lowers the viscosity of the glass to improve the production efficiency. $As_2O_3$ is a component functioning as an excellent refining agent capable of generating a refining gas in a wide temperature range. However, PbO and $As_2O_3$ are environmentally harmful substances and it is hence desirable to minimize the inclusion thereof.

As stated hereinabove, iron ions in the glass can be present in the $Fe^{3+}$ (divalent) and $Fe^{3+}$ (trivalent) states. $Fe^{2+}$ absorbs near-infrared light, while $Fe^{3+}$ absorbs visible-region light. It is hence necessary that a larger proportion of the Fe components in the glass according to this embodiment be present in the $Fe^{2+}$ state.

However, in cases when a molten glass has come into an oxidized state, this glass has an increased proportion of $Fe^{3+}$, which shows absorption at wavelengths around 400 nm, resulting in a decrease in transmittance at wavelengths around 400 nm. Because of this, the proportion of $Fe^{2+}$ to the total content of all the Fe components in terms of $Fe_2O_3$ (($Fe^{2+}$ (total Fe content))×100[%]) is regulated to 25-99%. Thus, the glass can absorb light having wavelengths of 1000 nm or longer while being inhibited from decreasing in transmittance at wavelengths around 400 nm.

In the case where the proportion of $Fe^{2+}$ to the total content of all the Fe components in terms of $Fe_2O_3$ in the glass is less than 25%, this glass has a reduced transmittance at wavelengths around 400 nm; such too low proportions of $Fe^{3+}$ are hence undesirable. In the case where the proportion thereof exceeds 99%, it is necessary that the atmosphere surrounding the molten glass be strictly controlled so as to be a reducing atmosphere, and this may result in an increase in production cost. In the glass according to this embodiment, the proportion of $Fe^{2+}$ to the total Fe content is preferably 30-99%, more preferably 35-99%, still more preferably 37-99%, yet still more preferably 38-99%, most preferably 40-99%.

In the expression $Fe^{2+}$ (total Fe content), "$Fe^{2+}$" represents content in mass % and "total Fe content" represents the total content in mass % of all the Fe components in which the iron has valences of two, three, and any other possible valences.

In melting raw materials for glass in producing the glass according to this embodiment, an organic substance such as sucrose, carbon, a metal powder, ammonium chloride, ammonium carbonate, etc. can be added as a reducing agent. Such reducing agents have the effect of regulating the proportion of Fe' to the total Fe content in the glass to a value within a desired range.

The amount of the reducing agent to be added is preferably 0.5-10 mass % in terms of outer percentage based on the total amount of a mixture of raw materials for the glass composition described above. In the case where the addition amount thereof is less than 0.5 mass %, the effect of regulating the proportion of Fe' to the total Fe content to a value within a desired range is insufficient. In the case where the addition amount thereof exceeds 10 mass %, the glass is difficult to form. The addition amount of the reducing agent is more preferably 1-8 mass %, still more preferably 3-6 mass %. Examples of the metal powder include Fe, Si, and Al, but the metal powder is not limited to such substances.

In melting raw materials for glass in producing the glass according to this embodiment, nitrogen, argon, or hydrogen gas can be caused to flow through the furnace or can be bubbled into the melt. The atmosphere within the furnace may be thereby kept in a reducing state to regulate the proportion of Fe' to the total Fe content in the glass to a value within a desired range.

The glass according to this embodiment may be one in which the proportion of $Fe^{2+}$ to the total Fe content in the glass has been regulated to a value within a desired value by irradiation with electromagnetic waves such as microwaves.

The glass according to this embodiment preferably has a coefficient of thermal expansion in the range of 30-300° C. of $60 \times 10^{-7}/°$ C. to $180 \times 10^{-7}/°$ C.

In the case where a near-infrared cut filter glass is used as the color correction filter of a solid imaging element, the glass is sometimes bonded directly to a packaging material because the glass functions also as a cover glass for airtightly sealing the solid imaging element. In this case, if there is a large difference in thermal expansion coefficient between the near-infrared cut filter glass and the packaging material, there is a possibility that the joint might suffer separation or damage, making it impossible to maintain the sealed state.

Considering heat resistance, as such packaging materials, materials such as glass, glass ceramics, ceramics, and alumina are typically used. It is preferred to reduce the difference in thermal expansion coefficient between such packaging materials and the near-infrared cut filter glass. It is hence preferable that the glass according to this embodiment is made to have a coefficient of thermal expansion in the range of 30-300° C. within the aforementioned range. In the case where the coefficient of thermal expansion of the near-infrared cut filter glass is out of the aforementioned range, there is a possibility that the difference in thermal expansion coefficient between this glass and the packaging material might be large, resulting in separation or damage to make it impossible to maintain the sealed state. A more preferred range of the coefficient of thermal expansion thereof is $65 \times 10^{-7}/°$ C. to $175 \times 10^{-7}/°$ C., and a still more preferred range thereof is $70 \times 10^{-7}/°$ C. to $170 \times 10^{-7}/°$ C.

An optical thin film, such as an antireflection film, an infrared cut film, or a film for blocking both ultraviolet light and infrared light, may be disposed on a surface of the glass according to this embodiment. These optical thin films are each a single-layer film or a multilayer film and can be formed by a known method such as vapor deposition or sputtering.

The near-infrared cut filter glass according to this embodiment can be produced in the following manner. First, raw materials are weighed and mixed so that the glass to be obtained has a composition within a desired range. This raw-material mixture is put into a crucible and melted by heating at a temperature of 1000-1400° C. in an electric furnace having a reducing atmosphere. The contents of the crucible are sufficiently stirred and refined, thereafter cast into a mold and gradually cooled, and then cut and polished to form a flat plate having a predetermined thickness.

Next, an optical filter according to this embodiment (hereinafter also referred to simply as "optical filter") will be explained. The optical properties of the optical filter according to this embodiment which will be described later may be ones determined by examining the optical filter in the state of either having a functional film, e.g., an antireflection film, provided to a principal surface thereof or having no such functional film on either of the principal surfaces.

The optical filter according to this embodiment includes the near-infrared cut filter glass according to this embodiment described above and an absorption layer provided on at least one principal surface of the glass, the absorption layer containing a near-infrared light absorber having a maximum-absorption wavelength in a wavelength range of 600-1200 nm. Since the optical filter has such configuration, the transmittance of the optical filter in any desired wavelength band in the wavelength range of 600-1200 nm can be regulated while maintaining the optical properties characteristic of the glass.

The optical filter according to this embodiment, preferably has an average transmittance in a wavelength range of 400-550 nm of 50% or higher, the average transmittance being measured when causing light to enter a principal surface of the optical filter from a normal direction. This configuration enables the optical filter to have a high transmittance for visible-region light and make it possible to obtain clear captured images.

In the case where the average transmittance of the optical filter in the wavelength range of 400-550 nm is less than 50%, there is a possibility that color reproducibility regarding blue and green might be poor, resulting in unclear captured images. The average transmittance of the optical filter in a wavelength range of 400-550 nm is more preferably 55% or higher, still more preferably 60% or higher.

The optical filter according to this embodiment preferably has a transmittance at a wavelength of 700 nm of 92% or less. This configuration enables the optical filter to have a high transmittance for red light and be suitable for use in sensing the state of the surrounding environment using captured images. For example, red lights from signals and red lights from illuminators other than signals can be more reliably distinguished from each other using captured images.

In the case where the transmittance of the optical filter at a wavelength of 700 nm exceeds 92%, it is necessary to reduce, as much as possible, the content in the glass of components which absorb red light and this may result in an increase in production cost.

The transmittance of the optical filter at a wavelength of 700 nm is more preferably 20-92%, still more preferably 30-92%, yet still more preferably 40-92%. In the case where the transmittance of the optical filter at a wavelength of 700 nm is less than 40%, there is a possibility that color reproducibility regarding red is poor, resulting in unclear captured images.

The optical filter according to this embodiment preferably has an average transmittance in a wavelength range of 850-950 nm of 70% or less. This configuration enables the optical filter to have an appropriately reduced transmittance for near-infrared light and hence be suitable for use in sensing the state of the surrounding environment using captured images.

In the case where the average transmittance of the optical filter in the wavelength range of 850-950 nm exceeds 70%, there is a possibility that color reproducibility regarding red might be poor due to near-infrared light, resulting in unclear captured images.

The average transmittance of the optical filter in a wavelength range of 850-950 nm is more preferably 0.0001-60%, still more preferably 0.0001-50%, yet still more preferably 0.0001-40%. In the case where the average transmittance of the optical filter in that wavelength range is less than 0.0001%, it is difficult to also attain the transmittance for light having a wavelength of 700 nm.

The optical filter according to this embodiment preferably has an average transmittance in a wavelength range of 1200-2500 nm of 60% or less. This configuration enables the optical filter to have a high transmittance for red light having longer wavelengths and be suitable for use in sensing the state of the surrounding environment using captured images.

In the case where the average transmittance of the optical filter in the wavelength range of 1200-2500 nm exceeds 60%, there is a possibility that if light having a wavelength within the above-mentioned range has entered an imaging device, the light might be insufficiently blocked and the solid imaging element might be damaged or operate erroneously.

The average transmittance of the optical filter in a wavelength range of 1200-2500 nm is more preferably 0.0001-50%, still more preferably 0.0001-40%. In the case where the average transmittance of the optical filter in that wavelength range is less than 0.0001%, it is difficult to also attain the transmittance for visible-region light.

The optical filter according to this embodiment preferably is one which, in a wavelength range of 550-1200 nm, has a difference of absolute values $|\lambda_{LO50(0\ deg)}-\lambda_{LO50(30\ deg)}|$ between $\lambda_{LO50(0\ deg)}$ and $\lambda_{LO50(30\ deg)}$ of 18 nm or less, the $\lambda_{LO50(0\ deg)}$ being a wavelength at which a transmittance of light caused to enter a principal surface of the optical filter from a normal direction is 50%, the $\lambda_{LO50(30\ deg)}$ being a wavelength at which a transmittance of light caused to enter the principal surface at an angle of 30° with respect to the normal direction is 50%. This configuration enables the optical filter to fluctuate little in transmission characteristics even when the distance between an imaging device and the solid imaging element is small and light enters at large incidence angles. Consequently, influences on captured images, e.g., color shifting, can be minimized.

In the case where the absolute value of the difference between those wavelengths, $|\lambda_{LO50(0\ deg)}-\lambda_{LO50(30\ deg)}|$, exceeds 18 nm, captured images may be affected when light enters the imaging device at large incidence angles.

In the optical filter, the absolute value of the difference between those wavelengths, $|\lambda_{LO50(0\ deg)}-\lambda_{LO50(30\ deg)}|$, is more preferably 16 nm or less, still more preferably 14 nm or less.

The transparent resin to be used in the absorption layer of the optical filter according to this embodiment is a resin which at least transmits visible light. It is preferable that the transparent resin to be used is one or more resins selected, for example, from the group consisting of acrylic resins, epoxy resins, ene-thiol resins, polycarbonate resins, polyether resins, polyarylate resins, polysulfone resins, polyethersulfone resins, poly(p-phenylene) resins, poly (arylene ether phosphine oxide) resins, polyimide resins, polyamideimide resins, polyolefin resins, cycloolefin resins, polyester resins, and the like. One of these resins may be used alone, or a mixture of two or more thereof may be used.

As the transparent resin, commercial products may be used. Examples of the commercial products include the following. Examples of polyester resins include OKP4HT, OKP4, B-OKP2, and OKP-850 (trade names; all manufactured by Osaka Gas Chemicals Co., Ltd.) and Vylon (registered trademark) 103 (trade name; manufactured by Toyobo Co., Ltd.).

Examples of polycarbonate resins include LeXan (registered trademark) ML9103 (trade name; manufactured by SABIC), EP5000 (trade name; manufactured by Mitsubishi Gas Chemical Co., Ltd.), SP3810 (trade name; manufactured by Teijin Ltd.), SP1516 (trade name; manufactured by Teijin Ltd.), TS2020 (trade name; manufactured by Teijin Ltd.), and xylex (registered trademark) 7507 (trade name; manufactured by sabic).

Examples of polyimide resins include Neopulim (registered trademark) C3650 (trade name; manufactured by Mitsubishi Gas Chemical Co., Ltd.), Neopulim C3G30-G (trade name; manufactured by Mitsubishi Gas Chemical Co., Ltd.), Neopulim C3450 (trade name; manufactured by Mitsubishi Gas Chemical Co., Ltd.), JL-20 (trade name; manufactured by New Japan Chemical Co., Ltd.), and FPC-0220 (trade name; manufactured by Mitsubishi Gas Chemical Co., Ltd.) (these polyimide resins may contain silica). Examples of acrylimide resins include PLEXIMID8817 (trade name; manufactured by Daicel-Evonik Ltd.).

A transparent resin is suitably selected from the standpoints of transparency, solubility of the near-infrared light absorber, and heat resistance. From the standpoint of heat resistance, a preferred transparent resin is one having a high glass transition point (Tg), e.g., a Tg of 140° C. or higher.

The absorption layer may further contain optional ingredients such as an adhesion promoter, a color correction dye, a leveling agent, an antistatic agent, a heat stabilizer, a light stabilizer, an antioxidant, a dispersant, a flame retardant, a lubricant, and a plasticizer, unless these ingredients impair the effects of the present invention.

In the optical filter according to this embodiment, the absorption layer preferably has a thickness of 0.1-100 μm. In the case where the absorption layer includes a plurality of layers, it is preferable that the total thickness of the layers is 0.1-100 μm. In the case where the thickness of the absorption layer is less than 0.1 μm, there is a possibility that this absorption layer cannot sufficiently exhibit the desired optical properties. In the case where the thickness thereof exceeds 100 μm, there is a possibility that the layer might have reduced flatness, resulting in in-plane unevenness in absorptivity. The thickness of the absorption layer is more preferably 0.3-50 μm. In the case where the optical filter is equipped with another functional layer, e.g., a reflection layer or an antireflection layer, there is a possibility that too large thicknesses of the absorption layer might cause a crack, etc., depending on the material of that functional layer. Because of this, the thickness of the absorption layer is more preferably 0.3-10 μm.

The absorption layer can be formed, for example, by dissolving or dispersing a near-infrared light absorber and either a transparent resin or a raw-material ingredient for a transparent resin in a solvent optionally together with other ingredients to produce a coating liquid, applying the coating liquid to a substrate, drying the applied coating liquid, and curing the resultant coating film according to need. The substrate may be a near-infrared cut filter glass to be a component of the optical filter according to this embodiment, or may be a releasing substrate used only in forming the absorption layer. The solvent may be any dispersion medium in which those ingredients can be stably dispersed or any solvent in which those ingredients can be stably dissolved.

The coating liquid may contain a surfactant for mitigating troubles such as voids due to fine bubbles, depressions due to the adhesion of foreign substances, etc., and cissing in the drying step. For applying the coating liquid, use can be made, for example, of dip coating, cast coating, spin coating, etc. After having been applied to a substrate, the applied coating liquid is dried, thereby forming an absorption layer. In the case where the coating liquid has contained a raw-material ingredient for a transparent resin, a curing treatment such as thermal curing or photocuring is further conducted.

Meanwhile, an absorption layer can be produced in a film shape by extrusion molding. This film may be superposed on a near-infrared cut filter glass to be a component of the optical filter according to this embodiment and integrated therewith by hot pressing, etc. For example, the film may be bonded to a surface of the near-infrared cut filter glass.

The near-infrared light absorber is preferably at least one dye selected from the group consisting of squarylium dyes, phthalocyanine dyes, cyanine dyes, and diimonium dyes.

These near-infrared light absorbers, when measured after having been incorporated into the transparent resin, have a maximum-absorption wavelength in the wavelength range of 600-1200 nm in a spectral transmittance curve over the 400-1200 nm wavelength range. The near-infrared light absorbers, in the aforementioned examination, preferably have a maximum-absorption wavelength in the wavelength range of 700-1200 nm, more preferably have a maximum-absorption wavelength in the wavelength range of 700-1100 nm. The absorption layer may contain a near-ultraviolet light absorber.

In the optical filter according this embodiment, the absorption layer containing a near-infrared light absorber may have been provided only on one principal surface or may have been provided to each of both principal surfaces. Furthermore, an optical thin film such as an antireflection film or an ultraviolet cut film may be provided on a surface of the optical filter or on the surface of the absorption layer on the optical filter. These optical thin films are each a single-layer film or a multilayer film, and can be formed by a known method such as vapor deposition or sputtering.

EXAMPLES

Examples of the near-infrared cut filter glass of the present invention and Comparative Examples are shown in Tables 1 and 2. Examples 1 to 5, 9, and 17 to 19 are Examples according to the present invention, and Examples 6 to 8 are Comparative Examples for the present invention.

These glasses were each produced in the following manner. Raw materials were weighed out and mixed so as to result in each of the compositions (mol %) shown in Tables 1 and 2. The mixture was put into a crucible having a capacity of about 400 cc and melted for 2 hours in a reducing atmosphere. Thereafter, the melt was refined and stirred, cast into a rectangular mold having dimensions of 100 mm (length)×80 mm (width)×20 mm (height) which had been preheated to about 300-500° C., and then gradually cooled at about 1° C./min to obtain a sample glass.

The raw materials for the glasses were as follows. For $P_2O_5$, use was made of one or more materials selected from the group consisting of $H_3PO_4$, $Al(PO_3)_3$, $Mg(PO_3)_2$, $Zn(PO_3)_2$, $LiPO_3$, $NaPO_3$, and $KPO_3$.

For $Al_2O_3$, $Al(PO_3)_3$ was used.

For $Li_2O$, use was made of one or more materials selected from the group consisting of $LiPO_3$, $LiNO_3$, and $Li_2CO_3$.

For $Na_2O$, use was made of one or more materials selected from the group consisting of $NaPO_3$, $NaNO_3$, and $Na_2CO_3$.

For $K_2O$, use was made of one or more materials selected from the group consisting of $KPO_3$, $KNO_3$, and $K_2CO_3$.

For $B_2O_3$, use was made of one or more materials selected from the group consisting of $PBO_4$, $H_3BO_3$, and BN.

For CaO, use was made of one or more materials selected from the group consisting of $Ca(PO_3)_2$ and $CaCO_3$.

For MgO, use was made of one or more materials selected from the group consisting of MgO and $Mg(PO_3)_2$.

For BaO, use was made of one or more materials selected from the group consisting of $Ba(PO_3)_2$ and $BaCO_3$.

For ZnO, use was made of one or more materials selected from oxides and $Zn(PO_3)_2$.

For Fe, use was made of one or more materials selected from oxides and metal powders.

Raw materials for the glasses are not limited to those shown above and known ones can be used.

TABLE 1

| | mol % | Example 1 | Example 2 | Example 3 | Example 4 | Example 5 | Example 6 | Example 7 | Example 8 | Example 9 |
|---|---|---|---|---|---|---|---|---|---|---|
| Glass components | $P_2O_5$ | 57.9 | 56.4 | 57.1 | 57.9 | 38.4 | 36. | 57.1 | 38.4 | 61.9 |
| | $Al_2O_3$ | 15.1 | 14.1 | 14.9 | 15.1 | 7.1 | 7.4 | 14.9 | 7.1 | 16.7 |
| | $Li_2O$ | 2.5 | 0.0 | 2.4 | 2.5 | 0.0 | 0.0 | 2.4 | 0.0 | 0.0 |
| | $Na_2O$ | 2.5 | 0.0 | 2.4 | 2.5 | 22.2 | 27.5 | 2.4 | 22.2 | 0.0 |
| | $K_2O$ | 1.6 | 8.1 | 1.6 | 1.6 | 0.0 | 0.0 | 1.6 | 0.0 | 1.8 |
| | CaO | 0.0 | 0.0 | 0.0 | 0.0 | 6.1 | 6.3 | 0.0 | 6.1 | 0.0 |
| | MgO | 4.0 | 5.0 | 4.0 | 2.0 | 6.1 | 6.3 | 4.0 | 6.1 | 0.0 |
| | BaO | 2.0 | 3.0 | 2.0 | 4.0 | 14.1 | 14.8 | 2.0 | 14.1 | 2.2 |
| | ZnO | 7.0 | 6.0 | 7.0 | 7.0 | 0.0 | 0.0 | 7.0 | 0.0 | 7.8 |
| | $Fe_3O_4$ | 3.4 | 3.4 | 3.6 | 3.4 | 0.0 | 1.6 | 3.6 | 0.0 | 4.1 |
| | Fe | 4.0 | 4.0 | 5.0 | 4.0 | 6.1 | 0.0 | 5.0 | 6.1 | 5.6 |
| | (Total iron components in terms of $Fe_2O_3$) | (7.04) | (7.04) | (7.94) | (7.04) | (3.03) | (2.38) | (7.94) | (3.03) | (8.9) |
| | Total | 100.0 | 100.0 | 100.0 | 100.0 | 100.0 | 100.0 | 100.0 | 100.0 | 100.0 |
| | Fe Redox (%) | 46.6 | 56.8 | 53.0 | 43.9 | 69.8 | 23.7 | 53.0 | 69.8 | 45.0 |
| Optical properties | Plate thickness [mm] | 0.3 | 0.3 | 0.3 | 0.3 | 0.3 | 0.3 | 7.0 | 0.2 | 0.3 |
| | Average transmittance in a wavelength range of 400-550 nm [%] | 88.8 | 88.6 | 88.4 | 88.2 | 73.5 | 68.3 | 44.9 | 78.9 | 88.3 |
| | Transmittance at wavelength of 700 nm [%] | 80.2 | 80.0 | 79.8 | 80.9 | 78.5 | 79.7 | 4.1 | 82.5 | 75.9 |
| | Average transmittance in a wavelength range of 850-950 nm [%] | 27.9 | 28.7 | 25.4 | 30.3 | 51.5 | 72.2 | <0.0001 | 62.2 | 20.7 |
| | Average transmittance in a wavelength range of 1200-2500 nm [%] | 23.1 | 21.1 | 20.4 | 25.1 | 55.0 | 77.5 | <0.0001 | 65.0 | 12.4 |

TABLE 2

| | mol % | Example 17 | Example 18 | Example 19 |
|---|---|---|---|---|
| Glass components | $P_2O_5$ | 59.1 | 58.3 | 57.8 |
| | $Al_2O_3$ | 15.9 | 15.7 | 15.6 |
| | $Li_2O$ | 0.0 | 0.0 | 0.0 |
| | $Na_2O$ | 0.0 | 0.0 | 0.0 |
| | $K_2O$ | 1.7 | 0.9 | 0.0 |
| | CaO | 0.0 | 0.0 | 0.0 |
| | MgO | 0.0 | 0.0 | 0.0 |
| | BaO | 2.1 | 2.1 | 0.0 |
| | ZnO | 7.4 | 8.2 | 11.0 |
| | $Fe_3O_4$ | 6.2 | 6.5 | 7.2 |
| | Fe | 7.4 | 8.4 | 8.3 |
| | (Total iron components in terms of $Fe_2O_3$) | (13.00) | (14.00) | (15.00) |
| | Total | 100.0 | 100.0 | 100.0 |
| | Fe Redox (%) | no data | no data | no data |
| Optical properties | Plate thickness [mm] | 0.3 | 0.3 | 0.3 |
| | Average transmittance in a wavelength range of 400-550 nm [%] | 86.5 | 85.9 | 86.0 |

TABLE 2-continued

| mol % | Example 17 | Example 18 | Example 19 |
|---|---|---|---|
| Transmittance at wavelength of 700 nm [%] | 72.3 | 71.2 | 71.1 |
| Average transmittance in a wavelength range of 850-950 nm [%] | 11.7 | 10.6 | 9.8 |
| Average transmittance in a wavelength range of 1200-2500 nm [%] | 6.4 | 5.6 | 5.2 |

Figure 2:
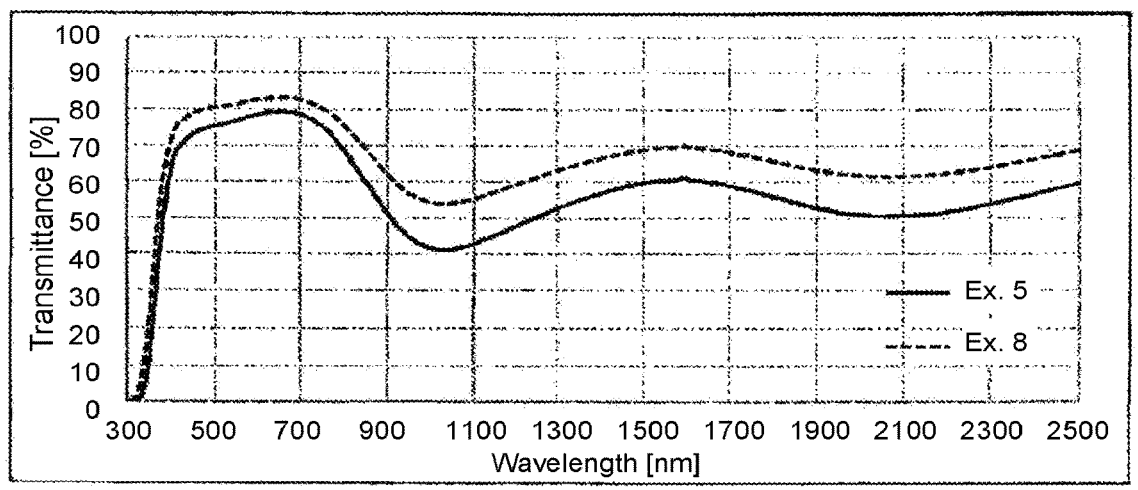
FIG. 2 is a diagram schematically showing examples of the transmittance characteristics of near-infrared cut filter glass according to an embodiment (Example 5) of the present invention and a comparative configuration (Example 8).

The glasses thus produced were evaluated for transmittance in a wavelength range of 300-2500 nm and the proportion of $Fe^{2+}$ to total Fe content (Fe Redox) or examined for these properties through calculations, by the following methods. The results thereof are shown in Tables 1 and 2. The transmittance characteristics of Examples 3 and 7 are shown in FIG. 1, and the transmittance characteristics of Examples 5 and 8 are shown in FIG. 2. The proportion of $Fe^{2+}$ to total Fe content in each of Examples 17 to 19 was not determined (no data).

Transmittance was evaluated using an ultraviolet/visible/near-infrared spectrophotometer (trade name V-570, manufactured by JASCO Corp.). Specifically, a plate-shaped glass sample which had dimensions of 40 mm (length)×30 mm (width)×0.3 mm (thickness) and in which both surfaces had been optically polished was prepared and measured for transmittance. The transmittances of Examples 7 and 8 were each calculated from the transmittance characteristics of a glass having the same glass composition (Example 7 was equal to Example 3 in glass composition, and Example 8 was equal to Example 5 in glass composition).

With respect to Fe components in a glass, the proportion of $Fe^{2+}$ to total Fe content was determined by the following method.

The total Fe content is the total content (%=mass percentage) of the entire iron in terms of $Fe_2O_3$. The amount of divalent iron ($Fe^{2+}$) in the glass, which was necessary for calculating the proportion, was determined by a wet analysis method. Specifically, the obtained glass was pulverized, and a solution obtained by dissolving the glass powder in HF (hydrofluoric acid) was mixed with bipyridyl and an ammonium acetate solution to cause a coloration. This solution was measured for absorbance peak intensity, and the content of divalent iron was determined on the basis of a calibration curve drawn beforehand using reference samples. From these, the proportion of $Fe^{2+}$ to total Fe content was calculated.

It can be seen that the glasses of the Examples according to the present invention were each lower in the average transmittances especially in a wavelength range of 850-950 nm and a wavelength range of 1200-2500 nm than the glasses of the Comparative Examples and had excellent optical properties.

Moreover, even glasses equal in composition considerably differ in optical property when differing in plate thickness, as shown in FIGS. 1 and 2. It can hence be seen that the plate thickness of the near-infrared cut filter glass of the present invention is not limited to specific values.

Next, Examples of the optical filter of the present invention and Reference Example are shown in Table 3. Examples 10 to 15 are Examples of the optical filter of the present invention, and Example 16 is Reference Example in which a near-infrared cut filter glass (Example 9) of the present invention was used.

The optical filters of Examples 10 to 15 were equal in constitution except the kind and addition amount of the near-infrared light absorber and the thickness of the absorption layer, and explanations are hence given on the common constitutions and production method. The addition amount of the near-infrared light absorber used in the optical filter of each Example and the thickness of the absorption layer therein are as shown in Table 3.

Figure 3:
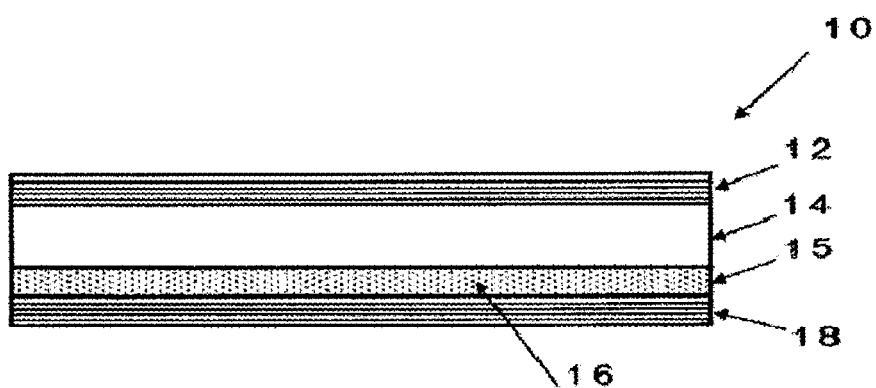
FIG. 3 is a schematic view of the cross-sectional configuration of the optical filters according to embodiments (Examples 10 to 15) of the present invention.

The optical filters of Examples 10 to 15 each included a near-infrared cut filter glass and an antireflection film provided on one principal surface thereof. The optical filter further included an absorption layer containing a near-infrared light absorber and provided on the other principal surface of the near-infrared cut filter glass and still further included an antireflection film provided on the surface of the absorption layer. The cross-sectional configuration of these optical filters is shown in FIG. 3.

A method used for producing the optical filters of Examples 10 to 15 is explained below in detail.

An antireflection film (total physical film thickness, 370 nm; the configuration is shown in Table 4) in which $SiO_2$ and $TiO_2$ were alternately laminated to form seven layers by vacuum deposition was disposed on one principal surface of the near-infrared cut filter glass (plate thickness: 0.2 mm) of Example 9. Subsequently, an absorption layer was formed on the other principal surface of the glass. The absorption layer was formed by the following method.

First, a polyimide varnish (trade name Neopulim (registered trademark) C3G30-G, manufactured by Mitsubishi Gas Chemical Co., Ltd.) as a transparent resin was diluted with cyclohexane solvent to prepare a resin solution. Subsequently, a near-infrared light absorber (the kind and addition amount thereof varied with Examples) was added to the resin solution and sufficiently dissolved therein, thereby obtaining a resin solution containing the near-infrared light absorber. A coating film (film of the resin solution containing the near-infrared light absorber) was disposed on the other principal surface of the near-infrared cut filter glass by spin coating and dried, thereby forming an absorption layer (the thickness thereof varied with Examples).

Subsequently, an antireflection film which was the same as that formed on the one principal surface was disposed by vacuum deposition on the surface of the absorption layer of the near-infrared cut filter glass, thereby obtaining an optical filter.

The near-infrared light absorbers used in the Examples are as follows. The maximum-absorption wavelengths of the near-infrared light absorbers in the resin are shown in Table 3.

The near-infrared light absorber of Example 10 was a dye synthesized in the following manner.

The squarylium dye represented by formula (Compound A) was synthesized by the method described in International Publication WO 2019/230660

[Chem. 1]

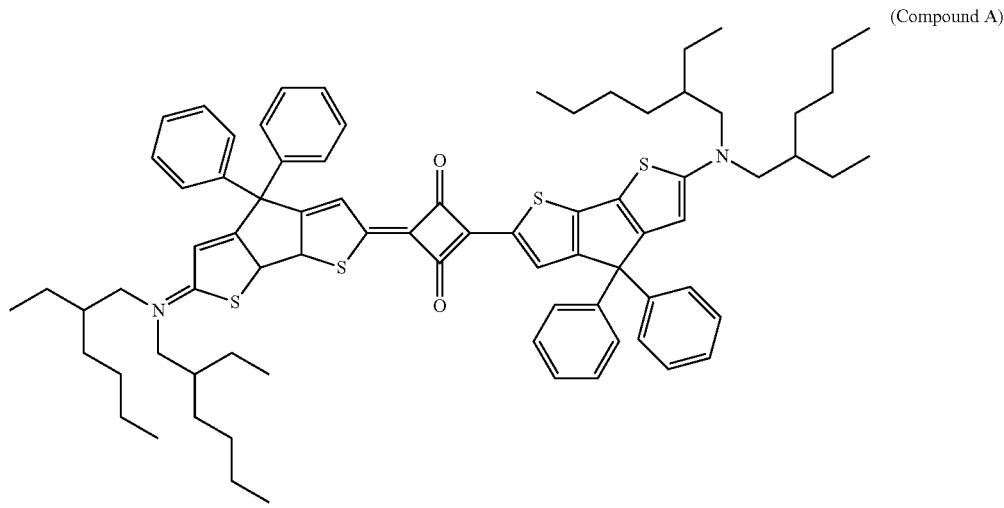

(Compound A)

The near-infrared light absorber of Example 11 was a dye synthesized in the following manner.

The diimonium dye represented by formula (Compound B) was synthesized by the method described in Japanese Patent No. 4800769.

[Chem. 2]

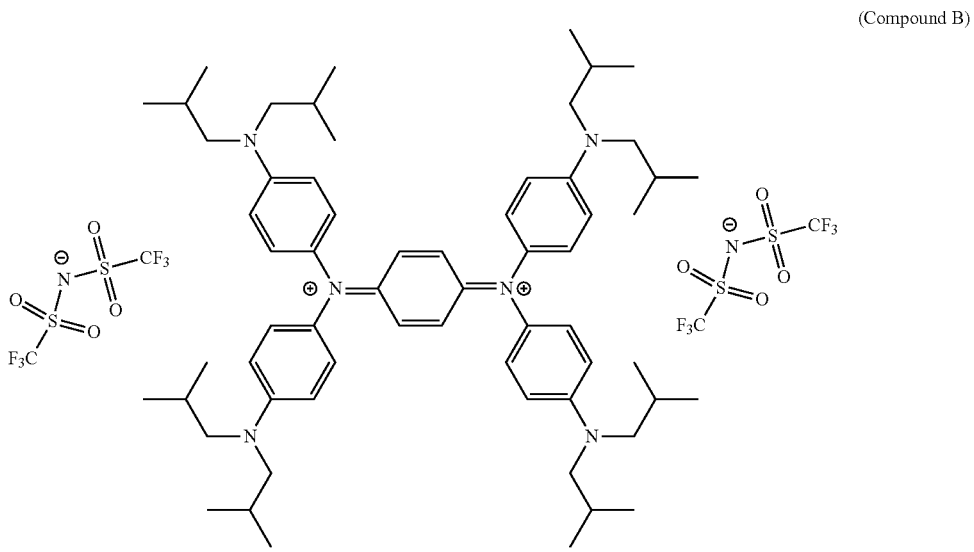

(Compound B)

The near-infrared light absorber of Example 12 was a dye synthesized in the following manner.

The cyanine dye represented by formula (Compound C) was synthesized by the method described in Dyes and pigments, 73(2007), 344-352.

[Chem. 3]

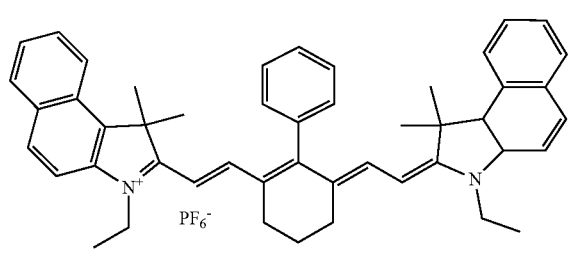
(Compound C)

The near-infrared light absorber of Example 13 was a dye synthesized in the following manner.

The cyanine dye represented by formula (Compound D) was synthesized by the method described in Dyes and pigments, 73(2007), 344-352.

[Chem. 4]

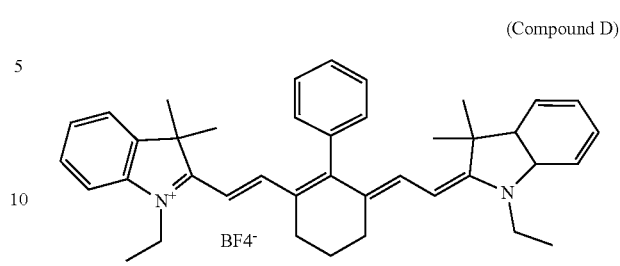
(Compound D)

The near-infrared light absorber used in Example 14 was a phthalocyanine dye (Type FDN-007, manufactured by Yamada Chemical Co., Ltd.).

The near-infrared light absorber of Example 15 was a dye synthesized in the following manner.

The squarylium dye represented by formula (Compound E) was synthesized by the method described in International Publication WO 2017/135359.

[Chem. 5]

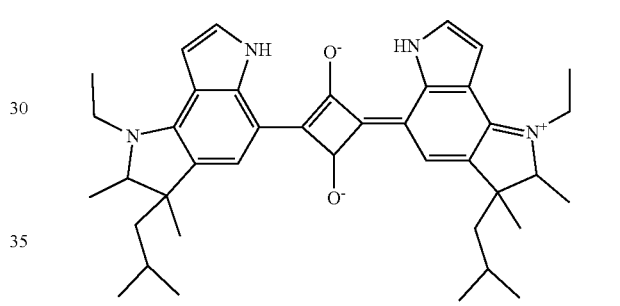
(Compound E)

TABLE 3

| | | Example 10 | Example 11 | Example 12 | Example 13 | Example 14 | Example 15 | Example 16 |
|---|---|---|---|---|---|---|---|---|
| Anti-reflection film | On the side of one principal surface | present | present | present | present | present | present | present |
| | On the side of the other principal surface | present | present | present | present | present | present | present |
| Absorption layer | Resin | C3G30-G | C3G30-G | C3G30-G | C3G30-G | C3G30-G | C3G30-G | none |
| | Thickness | 0.62 μm | 1.08 μm | 1.02 μm | 0.98 μm | 0.95 μm | 1.02 μm | none |
| Near-infrared light absorber | Structural formula | Compound A | Compound B | Compound C | Compound D | commercial product | Compound E | none |
| | Kind of dye | squarylium dye | diimonium dye | cyanine dye | cyanine dye | phthalocyanine dye | squarylium dye | none |
| | Maximum-absorption wavelength (in resin) | 929 nm | 1112 nm | 845 nm | 773 nm | 961 nm | 753 nm | none |
| | Concentration of near-infrared light absorber (based on resin weight) | 6.5 wt % | 10 wt % | 6 wt % | 5 wt % | 8 wt % | 3 wt % | zero |
| Near-infrared cut filter glass | Kind | glass (Example 9) | glass (Example 9) | glass (Example 9) | glass (Example 9) | glass (Example 9) | glass (Example 9) | glass (Example 9) |
| | Plate thickness | 0.20 mm | 0.20 mm | 0.20 mm | 0.20 mm | 0.20 mm | 0.20 mm | 0.20 mm |
| Optical properties of optical filter | Average transmittance in a wavelength range of 400-550 nm (0 deg) [%] | 91.6 | 86.4 | 86.4 | 90.0 | 80.5 | 93.7 | 96.7 |
| | Transmittance at wavelength of 700 nm (0 deg) [%] | 82.1 | 77.1 | 56.5 | 27.5 | 70.8 | 47.2 | 85.7 |
| | Average transmittance in a wavelength range of 850-950 nm (0 deg) [%] | 11.0 | 17.0 | 16.0 | 29.7 | 17.2 | 29.9 | 30.2 |

TABLE 3-continued

|  | Example 10 | Example 11 | Example 12 | Example 13 | Example 14 | Example 15 | Example 16 |
|---|---|---|---|---|---|---|---|
| Average transmittance in a wavelength range of 1200-2500 nm (0 deg) [%] | 21.7 | 12.7 | 22.0 | 22.0 | 21.9 | 22.0 | 21.8 |
| $\lambda_{LO50(0\ deg)}$ [nm] (1) | 791 | 788 | 710 | 670 | 792 | 696 | 827 |
| $\lambda_{LO50(30\ deg)}$ [nm] (2) | 783 | 776 | 705 | 667 | 782 | 692 | 814 |
| $\lambda_{LO50(0\ deg)} - \lambda_{LO50(30deg)}$ [nm] (1) − (2) | 8 | 12 | 5 | 3 | 10 | 4 | 13 |

TABLE 4

| Layer structure | Film material | Film thickness [nm] |
|---|---|---|
| Lower side | absorption layer or glass | |
| 1 | $SiO_2$ | 105 |
| 2 | $TiO_2$ | 5.3 |
| 3 | $SiO_2$ | 65.9 |
| 4 | $TiO_2$ | 29 |
| 5 | $SiO_2$ | 28.4 |
| 6 | $TiO_2$ | 38.8 |
| 7 | $SiO_2$ | 37.3 |
| Upper side | air | |

The optical filters thus produced were evaluated for transmittance in a wavelength range of 300-2500 nm using an ultraviolet/visible/near-infrared spectrophotometer (trade name V-570, manufactured by JASCO Corp.). Furthermore, with respect to each of the optical filters, the difference between a wavelength at which the transmittance for light entering at an incidence angle of 0° was 50% and a wavelength at which the transmittance for light entering at an incidence angle of 30° was 50% was calculated from the transmission characteristics obtained with the ultraviolet/visible/near-infrared spectrophotometer. The results thereof are shown in Table 3.

As apparent from the results given in Table 3, the optical filters each including a combination of a near-infrared cut filter glass of the present invention and an absorption layer containing a near-infrared light absorber having a specific maximum-absorption wavelength were able to be regulated so as to have any desired optical properties, without impairing the optical properties characteristic of the near-infrared cut filter glass.

Specifically, it can be seen that the optical filters of Examples 10 to 15 were able to be regulated so that a wavelength at which the transmittance was 50% was on the shorter-wavelength side within the near-infrared region, as compared with the near-infrared cut filter glass of Example 16. It can also be seen that the optical filter of Example 10 was able to be regulated so as to have a lowered average transmittance in a wavelength range of 850-950 nm, without considerably lowering the transmittance at a wavelength of 700 nm, as compared with the near-infrared cut filter glass of Example 16.

This application is based on Japanese patent application No. 2019-120235 filed on Jun. 27, 2019 and Japanese patent application No. 2020-017204 filed on Feb. 4, 2020, the contents thereof being incorporated herein by reference.

INDUSTRIAL APPLICABILITY

The glass according to the present invention can reduce the transmission of near-infrared-region light having wavelengths exceeding 1200 nm while retaining a high transmittance for visible-region light. This glass is hence extremely useful as near-infrared cut filter glass for solid imaging elements, infrared sensors, etc. and as optical filters.

REFERENCE SIGNS LIST

10 Optical filter
12 Antireflection film (on the side of one principal surface)
14 Near-infrared cut filter glass
15 Absorption layer
16 Near-infrared light absorber
18 Antireflection film (on the side of the other principal surface)

The invention claimed is:

1. A near-infrared cut filter glass, comprising:
$P_2O_5$, $Al_2O_3$, R'O, and $Fe_2O_3$ as essential components where R'O is at least one oxide selected from the group consisting of MgO, CaO, SrO, BaO and ZnO,
wherein the near-infrared cut filter glass comprises 5-35% of $Fe_2O_3$ by mol % based on oxides and substantially no fluorine and has an average transmittance of 50-92% in a wavelength range of 400-550 nm, a transmittance of 40-92% at a wavelength of 700 nm, an average transmittance of 0.0001-70% in a wavelength range of 850-950 nm, and an average transmittance of 0.0001-60% in a wavelength range of 1200-2500 nm.

2. The near-infrared cut filter glass according to claim 1, wherein the near-infrared cut filter glass comprises 40-75% of $P_2O_5$, 5-22% of $Al_2O_3$, 0-20% of $R_2O$ where $R_2O$ is a sum of $Li_2O$, $Na_2O$, and $K_2O$, and 0.1-35% of R"O where R"O is a sum of MgO, CaO, SrO, BaO, and ZnO by mol % based on oxides.

3. The near-infrared cut filter glass according to claim 1, wherein the near-infrared cut filter glass comprises 25-75% of $P_2O_5$, 2.5-22% of $Al_2O_3$, 0-35% of $R_2O$ where $R_2O$ is a sum of $Li_2O$, $Na_2O$, and $K_2O$, and 0.1-35% of R"O where R"O is a sum of MgO, CaO, SrO, BaO, and ZnO by mol % based on oxides.

4. The near-infrared cut filter glass according to claim 3, wherein the near-infrared cut filter glass comprises 40-75% of $P_2O_5$, 5-22% of $Al_2O_3$, 0.1-20% of $R_2O$ where $R_2O$ represents is the sum of $Li_2O$, $Na_2O$, and $K_2O$, and 0.1-25% of R"O where R"O is the sum of MgO, CaO, SrO, BaO, and ZnO by mol % based on oxides.

5. The near-infrared cut filter glass according to claim 4, wherein the near-infrared cut filter glass comprises 0.1-20% of ZnO by mol % based on oxides.

6. The near-infrared cut filter glass according to claim 1, wherein the near-infrared cut filter glass has a proportion by mass of divalent iron to a total iron content in terms of $Fe_2O_3$, $Fe^{2+}$/(total Fe content)×100, of 25-99%.

7. An optical filter, comprising:
the near-infrared cut filter glass of claim 1; and
an absorption layer formed on at least one surface of the near-infrared cut filter glass,
wherein the absorption layer includes a near-infrared light absorber having a maximum-absorption wavelength in a wavelength range of 600-1200 nm.

8. The optical filter according to claim 7, wherein the optical filter has an average transmittance of 50% or higher in a wavelength range of 400-550 nm, a transmittance of 92% or less at a wavelength of 700 nm, an average transmittance of 70% or less in a wavelength range of 850-950 nm, and an average transmittance of 60% or less in a wavelength range of 1200-2500 nm, where the transmittances are measured when causing light to enter the surface of the optical filter from a normal direction.

9. The optical filter according to claim 7, wherein the optical filter has, in a wavelength range of 550-1200 nm, a difference of absolute values $|\lambda_{LO50(0\ deg)}-\lambda_{LO50(30\ deg)}|$ between $\lambda_{LO50(0\ deg)}$ and $\lambda_{LO50(30\ deg)}$ of 18 nm or less, where the $\lambda_{LO50(0\ deg)}$ is a wavelength at which a transmittance of light caused to enter the surface from a normal direction is 50%, and the $\lambda_{LO50(30\ deg)}$ is a wavelength at which a transmittance of light caused to enter the surface at an angle of 30° with respect to the normal direction is 50%.

10. The optical filter according to claim 7, wherein the absorption layer comprises a transparent resin comprising a single resin or a mixture of a plurality of resins, and the single resin and the plurality of resins are selected from the group consisting of an acrylic resin, an epoxy resin, an ene-thiol resin, a polycarbonate resin, a polyether resin, a polyarylate resin, a polysulfone resin, a polyethersulfone resin, a poly(p-phenylene) resin, a poly(arylene ether phosphine oxide) resin, a polyimide resin, a polyamideimide resin, a polyolefin resin, a cycloolefin resin, and a polyester resin.

11. The optical filter according to claim 7, wherein the near-infrared light absorber comprises at least one dye selected from the group consisting of a squarylium dye, a phthalocyanine dye, a cyanine dye, and a diimonium dye.

12. The near-infrared cut filter glass according to claim 2, wherein the near-infrared cut filter glass has a proportion by mass of divalent iron to a total iron content in terms of $Fe_2O_3$, $Fe^{2+}$/(total Fe content)×100, of 25-99%.

13. The near-infrared cut filter glass according to claim 3, wherein the near-infrared cut filter glass has a proportion by mass of divalent iron to a total iron content in terms of $Fe_2O_3$, $Fe^{2+}$/(total Fe content)×100, of 25-99%.

14. The near-infrared cut filter glass according to claim 4, wherein the near-infrared cut filter glass has a proportion by mass of divalent iron to a total iron content in terms of $Fe_2O_3$, $Fe^{2+}$/(total Fe content)×100, of 25-99%.

15. The near-infrared cut filter glass according to claim 5, wherein the near-infrared cut filter glass has a proportion by mass of divalent iron to a total iron content in terms of $Fe_2O_3$, $Fe^{2+}$/(total Fe content)×100, of 25-99%.

16. An optical filter, comprising:
the near-infrared cut filter glass of claim 2; and
an absorption layer formed on at least one surface of the near-infrared cut filter glass,
wherein the absorption layer includes a near-infrared light absorber having a maximum-absorption wavelength in a wavelength range of 600-1200 nm.

17. An optical filter, comprising:
the near-infrared cut filter glass of claim 3; and
an absorption layer formed on at least one surface of the near-infrared cut filter glass,
wherein the absorption layer includes a near-infrared light absorber having a maximum-absorption wavelength in a wavelength range of 600-1200 nm.

18. An optical filter, comprising:
the near-infrared cut filter glass of claim 4; and
an absorption layer formed on at least one surface of the near-infrared cut filter glass,
wherein the absorption layer includes a near-infrared light absorber having a maximum-absorption wavelength in a wavelength range of 600-1200 nm.

19. An optical filter, comprising:
the near-infrared cut filter glass of claim 5; and
an absorption layer formed on at least one surface of the near-infrared cut filter glass,
wherein the absorption layer includes a near-infrared light absorber having a maximum-absorption wavelength in a wavelength range of 600-1200 nm.

20. An optical filter, comprising:
the near-infrared cut filter glass of claim 6; and
an absorption layer formed on at least one surface of the near-infrared cut filter glass,
wherein the absorption layer includes a near-infrared light absorber having a maximum-absorption wavelength in a wavelength range of 600-1200 nm.

* * * * *